United States Patent
Suzuki (10) Patent No.: US 12,470,516 B2
(45) Date of Patent: Nov. 11, 2025

(54) COMMUNICATION DEVICE AND NON-TRANSITORY COMPUTER-READABLE RECORDING MEDIUM STORING COMPUTER-READABLE INSTRUCTIONS FOR COMMUNICATION DEVICE

(71) Applicant: BROTHER KOGYO KABUSHIKI KAISHA, Nagoya (JP)

(72) Inventor: Satoshi Suzuki, Nagoya (JP)

(73) Assignee: BROTHER KOGYO KABUSHIKI KAISHA, Nagoya (JP)

(*) Notice: Subject to any disclaimer, the term of this patent is extended or adjusted under 35 U.S.C. 154(b) by 56 days.

(21) Appl. No.: 18/621,717

(22) Filed: Mar. 29, 2024

(65) Prior Publication Data
US 2025/0294007 A1   Sep. 18, 2025

(30) Foreign Application Priority Data
Mar. 14, 2024   (JP) .................................. 2024-040317

(51) Int. Cl.
| | |
|---|---|
| H04L 12/46 | (2006.01) |
| H04L 29/06 | (2006.01) |
| H04L 29/12 | (2006.01) |
| H04L 61/4511 | (2022.01) |
| H04L 61/5007 | (2022.01) |
| G06F 15/173 | (2006.01) |
| G06F 15/177 | (2006.01) |

(52) U.S. Cl.
CPC ...... H04L 61/4511 (2022.05); H04L 61/5007 (2022.05)

(58) Field of Classification Search
CPC . H04L 61/4511; H04L 61/5007; H04L 12/46; H04L 29/12; H04L 29/06; G06F 15/177; G06F 15/173
USPC ........................................................ 709/245
See application file for complete search history.

(56) References Cited

U.S. PATENT DOCUMENTS

| | | | |
|---|---|---|---|
| 9,253,347 B2 * | 2/2016 | Asai ...................... | G06F 3/1292 |
| 10,382,923 B2 * | 8/2019 | Tanji ...................... | H04W 4/70 |
| 2012/0326962 A1 * | 12/2012 | Asai ...................... | G06F 3/1204 |
| | | | 345/156 |

FOREIGN PATENT DOCUMENTS

| | | |
|---|---|---|
| JP | 2007-067604 A | 3/2007 |
| JP | 2019-101567 A | 6/2019 |

* cited by examiner

*Primary Examiner* — Jude Jean Gilles
(74) *Attorney, Agent, or Firm* — Kenealy Vaidya LLP

(57) ABSTRACT

A communication device includes a controller configured to: receive a first IP address of a first external device as an input by a user; store the first IP address received as a first setting in a memory; receive first name information including a first name of the first external device as an input by the user; store the first name information received as a second setting different from the first setting in the memory; obtain a second IP address of the first external device by performing a name resolution with the first name; determine whether the second IP address matches with the first IP address; and in a case where the controller determines that the second IP address does not match with the first IP address, perform a specific process that is relevant to storing the second IP address in the memory as the first setting.

23 Claims, 7 Drawing Sheets

FIG. 4

FIG. 5
(THIRD EMBODIMENT)

| DEVICE NAME | IP ADDRESS |
|---|---|
| TN1 | IP1 |

SCANNER 10  
TERMINAL 100

(SAME AS T10 TO T24 OF FIG. 2)

(T230) DISPLAY SETTING SCREEN SC100

SC100:
FIREWALL SETTING
"PLEASE INPUT IP ADDRESS OF EXTERNAL DEVICE THAT IS PERMITTED TO COMMUNICATE WITH SCANNER"
[ OK ]

(T232) INPUT TN1 + SELECT OK (T234) DEVICE NAME TN1

DNS SERVER 200

(T240) DEVICE NAME TN1

(T242) SPECIFY IP ADDRESS IP1

(T244) IP ADDRESS IP1

(T246) STORING

TERMINAL 100

(T250) CHANGE TO IP ADDRESS IP2

DNS SERVER 200

(T252) DEVICE NAME TN1, IP ADDRESS IP2

| DEVICE NAME | IP ADDRESS |
|---|---|
| TN1 | IP2 |

(T254) STORING (T260) SELECT SCAN BOX SETTING (T262) REQUEST SCAN BOX SETTING SCREEN (T264) SCAN BOX SETTING SCREEN DATA (T270) DISPLAY SETTING SCREEN SC20

(T272) INPUT "TN1/SCAN_FOLDER" + SELECT OK (T274) FOLDER NAME "TN1/SCAN_FOLDER"

(T276) STORING (B)   (B)

COMMUNICATION DEVICE AND NON-TRANSITORY COMPUTER-READABLE RECORDING MEDIUM STORING COMPUTER-READABLE INSTRUCTIONS FOR COMMUNICATION DEVICE

REFERENCE TO RELATED APPLICATIONS

This application claims priority from Japanese Patent Application No. 2024-040317 filed on Mar. 14, 2024. The entire content of the priority application is incorporated herein by reference.

BACKGROUND ART

A technique of filtering communication in accordance with the setting of a firewall is known.

SUMMARY

Aspects of the disclosure provides a technique capable of appropriately performing communication with an external device.

A communication device according to an aspect of the disclosure may include a memory and a controller. The controller is configured to: receive a first IP address of a first external device as an input by a user; store the first IP address received as a first setting in the memory; receive first name information including a first name of the first external device as an input by the user; store the first name information received as a second setting different from the first setting in the memory; after the first IP address has been stored as the first setting in the memory and the first name information has been stored as the second setting in the memory, obtain a second IP address of the first external device by performing a name resolution with the first name included in the first name information; determine whether the second IP address matches with the first IP address included in the first setting in the memory; and in a case where the controller determines that the second IP address does not match with the first IP address included in the first setting in the memory, perform a specific process that is relevant to storing the second IP address in the memory as the first setting.

According to the above configuration, in a case where the communication device determines that the second IP address does not match with the first IP address included in the first setting in the memory, the communication device performs the specific process that is relevant to storing the second IP address in the memory as the first setting. Thus, the communication device may appropriately perform communication with the external device.

A communication device according to another aspect of the disclosure may include a memory and a controller. The controller is configured to: receive a first name of a first external device as an input by a user; obtain a first IP address of the first external device by performing a name resolution with the first name received; store the first name and the first IP address in association with each other as a first setting in the memory; receive first name information including the first name of the first external device as an input by a user; store the first name information received as a second setting different from the first setting in the memory; after the first name and the first IP address have been stored as the first setting in the memory and the first name information has been stored as the second setting in the memory, obtain a second IP address of the first external device by performing a name resolution with the first name included in the first name information; determine whether the second IP address matches with the first IP address associated with the first name as the first setting in the memory; and in a case where the controller determines that the second IP address does not match with the first IP address, update the first IP address associated with the first name as the first setting to the second IP address.

According to the above configuration, in a case where the communication device determines that the second IP address does not match with the first IP address, the communication device updates the first IP address associated with the first name as the first setting to the second IP address. Thus, the communication device may appropriately perform communication with the external device.

A computer-readable recording medium storing computer-readable instructions, and a method executed by the communication device are also novel and useful.

DESCRIPTION

First Embodiment

Figure 1:
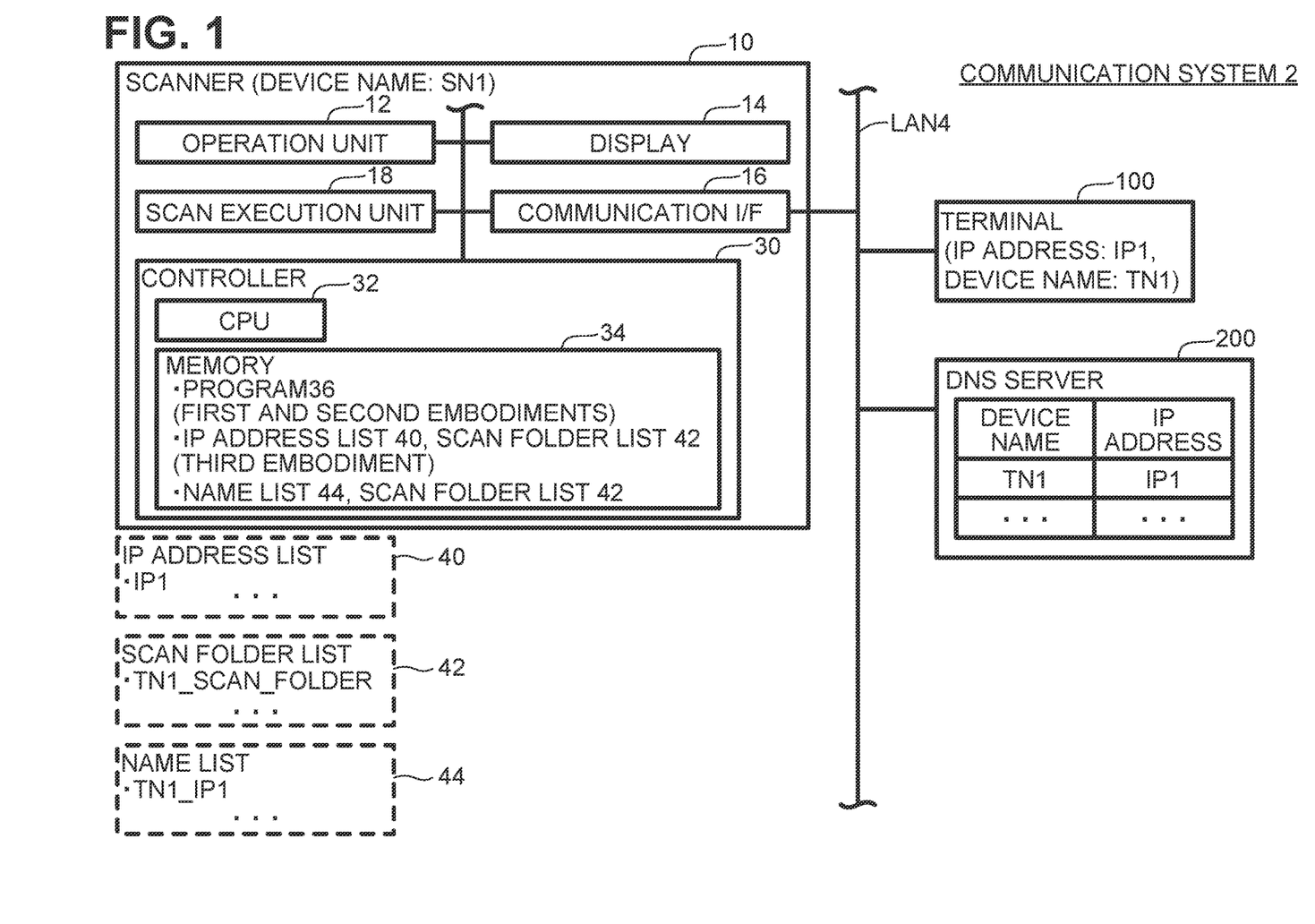
FIG. 1 is a block diagram of a communication system.

Configuration of Communication System; FIG. 1

As shown in FIG. 1, the communication system 2 includes a scanner 10, a terminal 100, and a DNS server 200. The devices 10, 100, and 200 are connected to the LAN 4. The devices 10, 100, and 200 is capable of communicate with each other via the LAN 4. The LAN 4 may be a wireless local area network (LAN) or a wired LAN.

Configuration of the Scanner 10

The scanner 10 is a peripheral device capable of executing a scanning function, for example, a peripheral device of the terminal 100. In a modification, the scanner 10 may be a multi-function device capable of executing another function such as a printing function and a facsimile function in addition to the scanning function. A device name SN1 is assigned to the scanner 10. The scanner 10 includes an operation unit 12, a display unit 14, a communication interface 16, a scan execution unit 18, and a controller 30. The units 12, 14, 16, 18 and 30 are connected to a bus line. Hereinafter, the interface is referred to as an "I/F".

The operation unit 12 is an I/F that enables a user to input various kinds of information to the scanner 10, and includes, for example, a touch screen and buttons. The user can input various kinds of information to the scanner 10 via the operation unit 12. The display unit 14 is a display for displaying various kinds of information. Communication I/F 16 is connected to the LAN 4. The scan execution unit 18 includes a scan mechanism such as a CIS or a CCD.

The controller 30 includes a CPU 32 and a memory 34. The memory 34 includes a main storage device and an auxiliary storage device. The main storage device includes, for example, a RAM, a cache memory. The auxiliary storage device may be, for example, a flash memory, a solid state drive (SSD), a ROM, or a combination thereof. The program 36 is stored in the auxiliary storage device. The CPU 32 realizes various processing in accordance with a program 36 loaded from the auxiliary storage device to the main storage device.

The memory 34 further stores an IP address list 40 and a scan folder list 42. The IP address list 40 is a list of IP addresses of external devices that are allowed to communicate with the scanner 10, that is, a so-called white list. The scanner 10 can perform communication with the external device using the IP address included in the IP address list 40, and cannot perform communication with the external device using the IP address not included in the IP address list 40. The scan folder list 42 is a list of folder names of folders in which scan data is stored.

Configuration of Terminal 100

The terminal 100 is a portable terminal device such as a mobile phone, a smartphone, a PDA, or a tablet PC. In a modification, the terminal 100 may be a stationary PC, a laptop PC, or the like. An IP address IP1 and a device name TN1 are assigned to the terminal 100. The IP address IP1 consists of a plurality of alphanumeric characters, and is, for example, "192.168.0.0". Here, the IP address IP1 is automatically assigned to the terminal 100 by a Dynamic Host Configuration Protocol (DHCP) server. Due to this configuration, the IP address assigned to the terminal 100 may be changed by the DHCP server. On the other hand, the device names TN1 assigned to the terminal 100 is fixed unless changed by the user. The DHCP server may be formed integrally with the DNS server 200, or may be formed separately from the DNS server 200. In the latter case, the DHCP server is not shown in FIG. 1.

Configuration of DNS Server 200

The DNS server 200 stores a name and an IP address of each device in the LAN 4 in association with each other. For example, in the example of FIG. 1, the device name TN1 of the terminal 100 and the IP address IP1 of the terminal 100 are stored in association with each other. As described above, the IP address assigned to the terminal 100 may be changed. In this case, the DNS server 200 changes the IP address associated with the device name TN1 of the terminal 100. The scanner 10 can perform name resolution for specifying an IP address from a device name by using the DNS server 200.

Here, it is assumed that the scanner 10 receives, from the user, a scan execution instruction in which a folder name of a specific folder in the terminal 100 is designated. In such a situation, the scanner 10 transmits the scan data to the terminal 100 and stores the scan data in the specific folder. If the IP address list 40 does not include the IP address of the terminal 100, the scanner 10 cannot transmit the scan data to the terminal 100. In the present embodiment, a technique for appropriately transmitting scan data from the scanner 10 to the terminal 100 will be disclosed.

Figure 2:
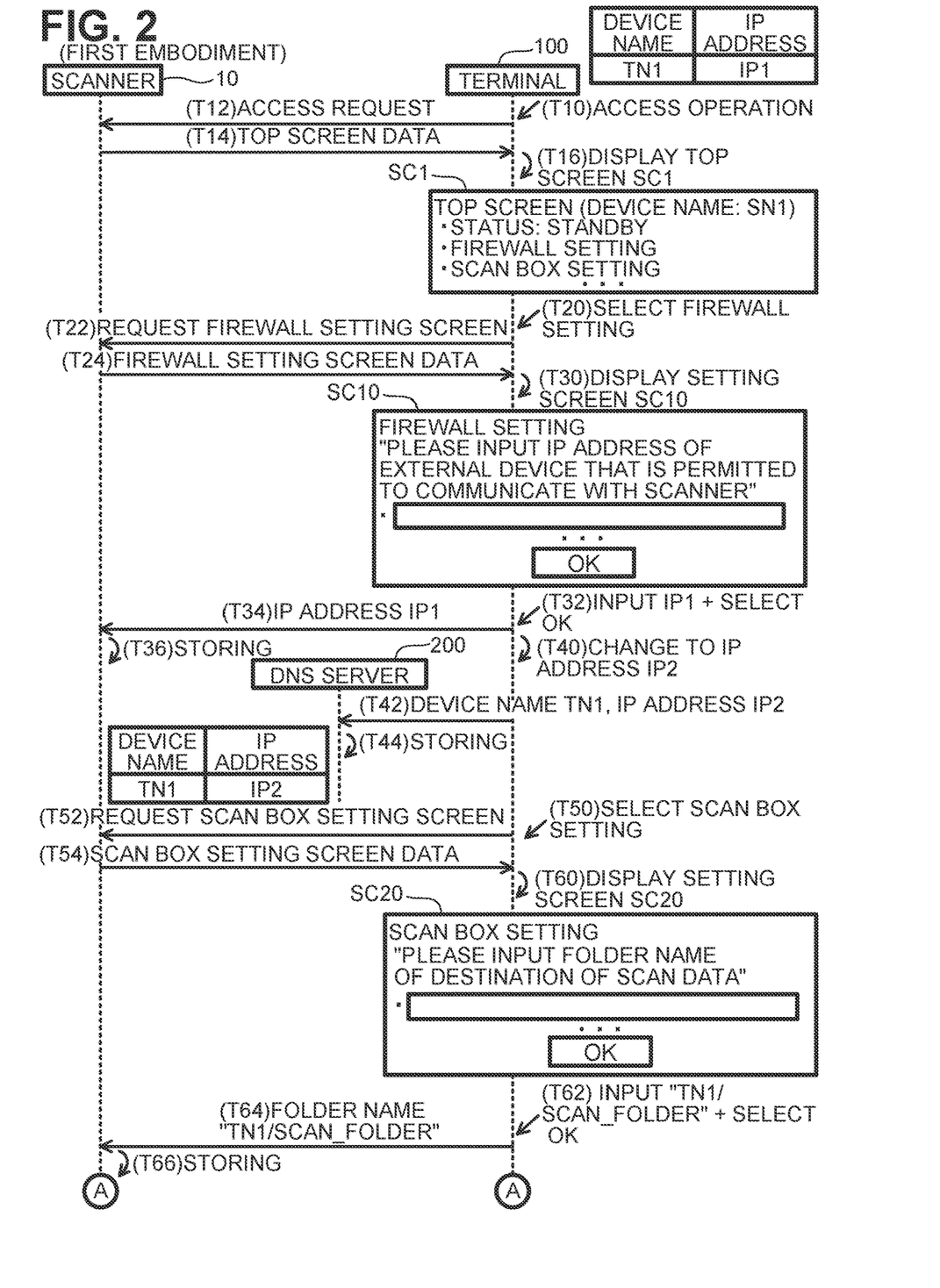
FIG. 2 is a sequence of the first and second embodiments.

Processing Executed by Each Device; FIG. 2

Next, processing executed by each device 10, 100 and the like will be described with reference to FIG. 2. In the following description, the devices (e.g., the scanner 10, the terminal 100, and the DNS server 200), instead of the CPUs, are described as the subjects of the processing for ease of understanding. Communication between the devices is performed via the communication I/F (for example, the communication I/F 16). Therefore, in the following description, the description "via a communication I/F" will be omitted when describing communication.

In the initial state of FIG. 2, the terminal 100 are assigned IP address IP1. That is, the DNS server 200 stores the devices name TN1 and the IP address IP1 in association with each other.

In T10, the terminal 100 receives an access operation for using the web server function of the scanner 10 from the user. The access operation includes input of a user ID and a password of the scanner 10. In this case, in T12, the terminal 100 transmit access request including the input user ID and password to the scanner 10.

In response to receiving the access request from the terminal 100 in T12, the scanner 10 performs authentication of the user ID and password included in the access request. Specifically, the scanner 10 determines whether the combination of the user ID and the password has been stored. In response to the authentication being successful (i.e., if the combination of the user ID and the password is stored), in T14, the scanner 10 transmits the top screen SC1 to the terminal 100. As described above, in a situation where the authentication of the user ID and the password is successful, the scanner 10 may receive a request including an IP address that is not included in the IP address list 40 as the transmission source IP address, and transmit a response (i.e., the top screen data in the above example) including the IP address as the transmission destination IP address. In a modification, the scanner 10 may permit access to the top screen SC1 from an external apparatus having an IP address not included in the IP address list 40 without performing the authentication. In this modification, in a case where the subsequent authentication is successful or where the scanner 10 is requested from an external apparatus having the IP address included in the IP address list 40, the scanner 10 may permit access to a screen (e.g., a setting screen SC1 described later) lower than the top screen SC10.

In response to receiving the top screen from the scanner 10 in T14, in T16, the terminal 100 displays the top screen SC1. The top screen SC1 includes a name SN1 of the scanner 10 and a plurality of icons for executing various processing related to the scanner 10. The plurality of icons include, for example, a status icon, a firewall setting icon, and a scan box setting icon.

The status icon is an icon for receiving the status of the scanner 10. The firewall setting icon is an icon for changing the IP address in the IP address list 40. The scan box setting icon is an icon for changing a folder name in the scan folder list 42.

In response to receiving a selection of the firewall setting icon in the top screen SC1 from the user in T20, in T22, the terminal 100 transmits a firewall setting screen request to the scanner 10.

In response to receiving the request for the firewall setting screen from the terminal 100 in T22, in T24, the scanner 10 transmits the firewall setting screen representing the setting screen SC10 to the terminal 100.

In response to receiving the firewall setting screen from the scanner 10 in T24, in T30, the terminal displays the setting screen SC10. The setting screen SC10 includes a message prompting the user to input the IP address of the external device that are permitted to communicate with the scanner 10, a plurality of IP address input fields, and an OK button. In a case where the IP address list 40 has already stored one or more IP addresses, the one or more IP addresses are described in one or more IP address input fields among the plurality of IP address input fields.

In T32, the terminal 100 receives the user's input of the IP address IP1 of the terminal 100 in one IP address input field in the setting screen SC10, and then receives the selection of the OK button. In this case, in T34, the terminal 100 transmits the input IP address IP1 to the scanner 10.

In response to receiving the IP address IP1 from the terminal 100 in T34, in T36, the scanner 10 stores the IP address IP1 in the IP address list 40. Thus, the scanner 10 may perform communication using the IP address IP1. By performing the processing in T36, only the IP address IP1 may be stored in the IP address list 40.

Thereafter, for example, after the terminal 100 is restarted, in T40, the IP address assigned to the terminal 100 is changed from IP1 to IP2. The IP address IP2 consists of a plurality of alphanumeric characters, and is, for example, "192.168.0.1". In this case, in T42, the terminal 100 transmits the devices name TN1 and the IP address IP2 to the DNS server 200.

In response to receiving the device name TN1 and the IP address IP2 from the terminal 100 in T42, in T44, the DNS server stores the device name TN1 and the IP address IP2. In particular, the DNS server 200 determines whether the device name TN1 has been stored. If the device name TN1 has been stored, the DNS server 200 stores the IP address IP2 instead of the IP address IP1 in association with the device name TN1. If the device name TN1 has not been stored, the DNS server 200 newly stores the device name TN1 and the IP address IP2 in association with each other.

Thereafter, in response to receiving a selection of the scan box setting icon in the top screen SC1 from a user in T50, in T52, the scanner 10 transmits a scan box setting screen request to the scanner 10.

In response to receiving the scan box setting screen request from the terminal 100 in T52, in T54, the scanner 10 transmits the scan box setting screen representing the setting screen SC20 to the terminal 100.

In response to receiving the scan box setting screen from the scanner 10 in T54, in T60, the terminal 100 displays the setting screen SC20. The setting screen SC20 includes a message prompting the user to input a folder name of a storage destination of the scan data, a plurality of folder name input fields, and an OK button.

In T62, the terminal 100 accepts the user's input of the folder name "TN1/SCAN FOLDER" in the terminal 100 in one folder name input field in the setting screen TN1, and then accepts the selection of the OK button. In the present embodiment, a character string ("TN1" in the above example) described before the character "/" included in the folder name indicates the device name. In T64, the terminal 100 transmits the input folder name "TN1/SCAN_FOLDER" to the scanner 10.

In response to receiving the folder name "TN1/SCAN_FOLDER" from the terminal 100 in T64, in T66, the scanner 10 stores the folder name in the scan folder list 42. By performing the processing in T66, only the folder name "TN1/SCAN_FOLDER" may be stored in the scan folder list 42. This allows the user to designate the folder having the folder name as the storage destination of the scan data.

Figure 3:
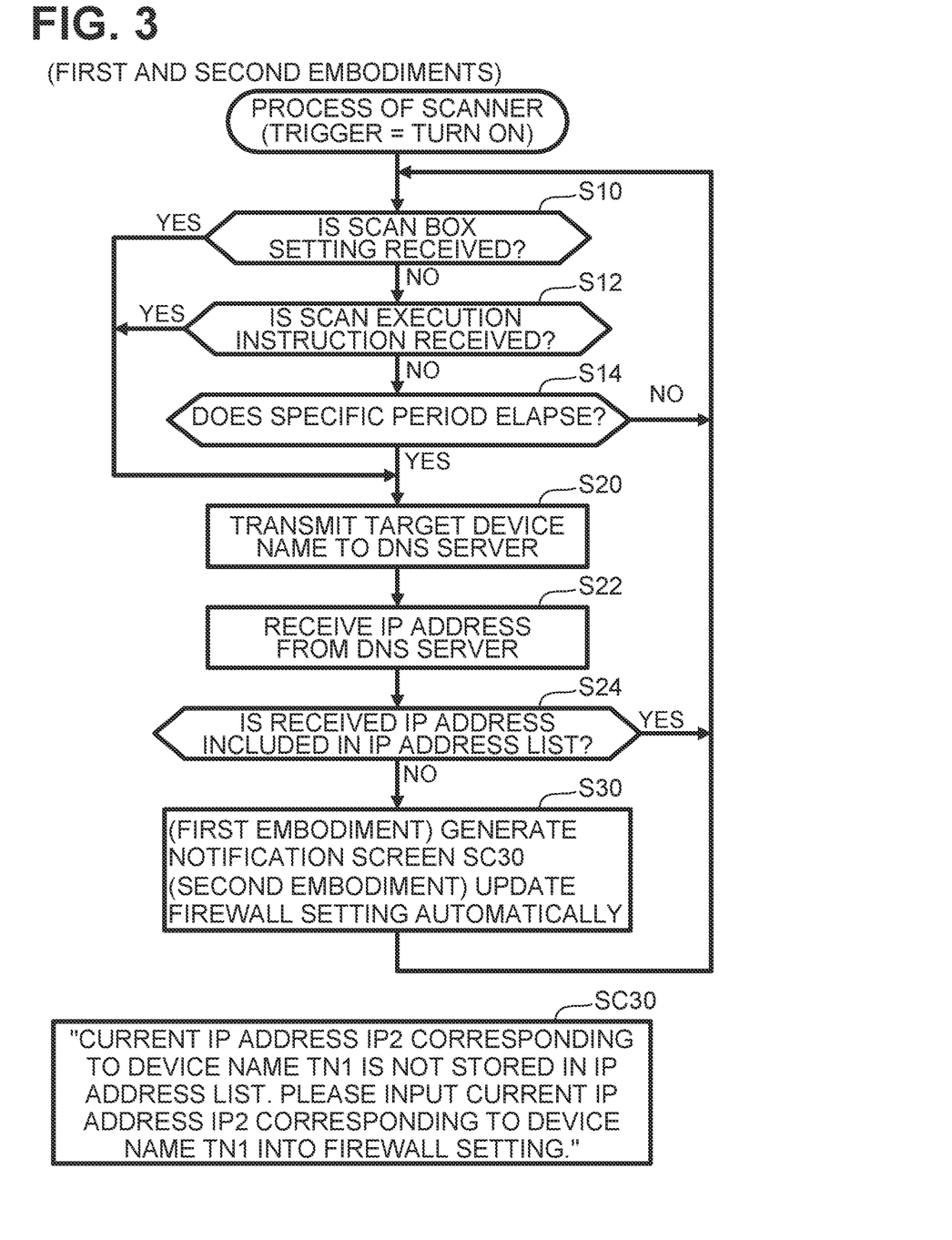
FIG. 3 is a flowchart of the processing executed by the scanner of the first and second embodiments.

Processing of Scanner; FIG. 3

Next, a processing realized by the CPU32 of the scanner 10 executing the program 36 will be described with reference to FIG. 3. The processing of FIG. 3 is started when the power of the scanner 10 is turned on. In the following description of FIG. 3, unless otherwise noted, a situation where a single IP address is stored in the IP address list 40 will be described (see T36 in FIG. 2).

In S10, the CPU 32 monitors whether the user's input of a folder name is received after the scan box setting icon (see the top screen SC1 of FIG. 2) is selected. Specifically, the CPU 32 monitors whether the folder name (see T64) is received after the scan box setting screen request (see T52) is received from the external apparatus (for example, the terminal 100). In response to receiving the folder name from the external apparatus (YES in S10), the CPU 32 proceeds the processing to S20. Hereinafter, the device name included in the folder name received here is referred to as a "target device name". Although not shown in FIG. 3, if the CPU 32 determines YES in S10, the CPU 32 stores the received folder name in the scan folder list 42.

In S12, the CPU 32 monitors whether a scan execution instruction is received from the user.

In response to receiving the scan execution instruction from the user via the operation unit 12 (YES in S12), the CPU 32 proceeds the processing to S20. The scan execution instruction includes designation of a folder name of a folder in which the scan data is stored. In the following description, the device name included in the folder name designated here is also referred to as a "target device name".

In S14, the CPU 32 monitors whether a predetermined time has elapsed since the processing after the S20 was executed. The CPU 32 proceeds the processing to S20 if the predetermined time has elapsed (YES in S14).

In S20 and S22, the CPU 32 executes a name resolution using the target device name, and receives the IP address. For example, in S20 after YES in S10, the CPU 32 specifies the device name included in the folder name received from the external apparatus as the target device name.

In S20 after YES in S12, the CPU 32 specifies the device name included in the folder name designated by the scan execution instruction as the target device name. In S20 after YES in S14, the CPU 32 specifies, for each of the one or more folder names in the scan folder list 42, the device name in the folder name as the target device name. Then, in S20, the CPU 32 transmits the specified target device name to the DNS server 200, and in S22, the CPU 32 receives the IP address associated with the target device name from the DNS server 200. In this way, the CPU 32 may receive the IP address associated with the target device name by using the DNS server 200. Hereinafter, the IP address received here is referred to as a "target IP address".

In S20 and S22 after YES in S14, the CPU 32 receives, for each of the one or more target device names, the target IP address associated with the target device name. Then, the CPU 32 executes a determination of S24 described later for each of the one or more target IP addresses, and executes processing of S30 described later for the target IP address for which NO is determined in S24.

In S24, the CPU 32 determines whether the target IP address is included in the IP address list 40.

Specifically, the CPU 32 determines whether the target IP address matches an IP address included in the IP address list 40. Here, "the target IP address matches an IP address included in the IP address list 40" means that a plurality of alphanumeric characters in one IP address matches a plurality of alphanumeric characters in the other IP address. For example, the IP address IP1 (i.e., "192.68.0.0") does not match the IP address IP2 (i.e., "192.168.0.1") because the number in lowest digit is different from each other. If the target IP address matches an IP address included in the IP address list 40 (YES in S24), the CPU 32 returns the processing to monitoring of S10 and the like. On the other hand, if the target IP address does not match an IP address included in the IP address list 40 (NO in S24), the CPU 32 proceeds the processing to S30. In modification in which one or more IP addresses are stored in the IP address list 40, in S24, the CPU 32 determines whether the target IP address matches either of the one or more IP addresses included in the IP address list 40. In this modification, if the CPU 32 determines that the target IP address matches either of the one or more IP addresses included in the IP address list 40, the CPU 32 determines YES in S24. On the other hand, if the CPU 32 determines that the target IP address does not match any of the one or more IP addresses included in the IP address list 40, the CPU 32 determines NO in S24.

Although not shown, if the CPU 32 determines YES in S12 and YES in S24, the CPU 32 executes scanning in accordance with the scan execution instruction and transmits the scan data to the destination folder (e.g., the terminal 100). On the other hand, if the CPU 32 determines YES in S12 and NO in S24, the CPU 32 does not transmit the scan data due to the target IP address being not included in the IP address list 40 (i.e., the target IP address not matching an IP address included in the IP address list 40).

In S30, the CPU 32 generates a notification screen data representing a notification screen SC30 and stores the notification screen data in the memory 34. The notification screen SC30 includes a message indicating that the target IP address is not included in the IP address list 40 and a message prompting the user to input the target IP address to the setting screen SC10 (see FIG. 2).

The CPU 32 stores the notification screen data in the memory 34, and thereafter, in response to receiving an access request (see T12 in FIG. 2) from the terminal 100, the CPU 32 may transmit the top screen data (T14) and the notification screen data to the terminal 100. This allows the notification screen SC30 to be displayed on the terminal 100 in a superimposed manner on the top screen SC1. In response to completion of processing in S30, the CPU 32 returns the processing to the monitoring of the S10 and the like.

Figure 4:
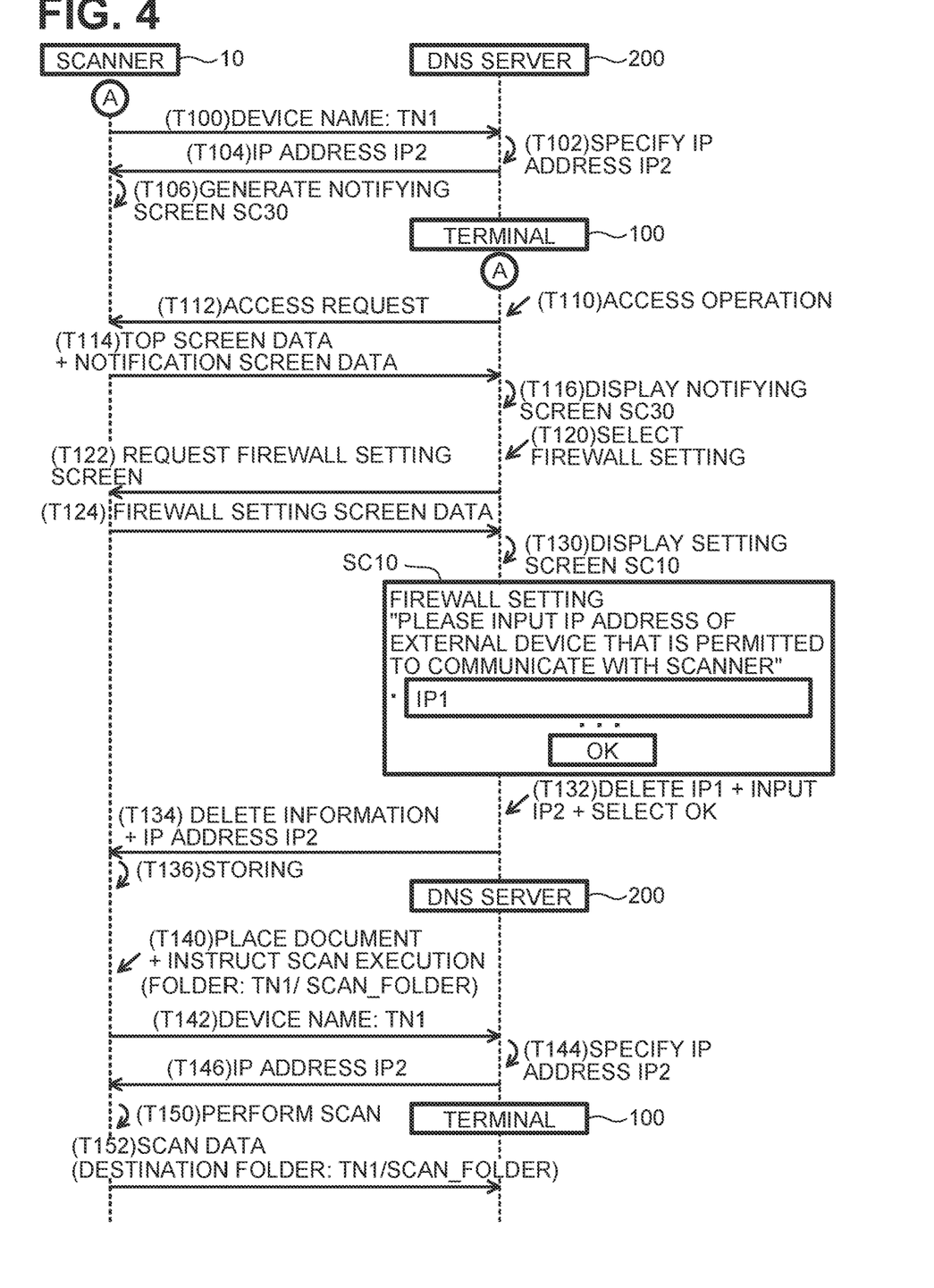
FIG. 4 is a sequence continued from FIG. 2.

Continuation of FIG. 2; FIG. 4

Next, the processing realized by the flowchart of FIG. 3 will be described with reference to FIG. 4. FIG. 4 is a continuation of FIG. 2. As described above, the scanner 10 has already received the folder name "TN1/SCAN_FOLDER" from the terminal 100 in T64 of FIG. 2 (YES in S10 of FIG. 3). In this case, the scanner 10 specifies the device name TN1 included in the folder name. In T100, the scanner 10 transmits the specified device name TN1 to the DNS server 200 (S20).

In response to receiving the device name TN1 from the scanner 10 in T100, in T102, the DNS server 200 specifies the IP address IP2 (see T44 in FIG. 2) associated with the device name TN1. Then, in T104, the DNS server 200 transmits the specified IP address IP2 to the scanner 10.

In T104, the scanner 10 receives IP address IP2 (i.e., target IP address) from the DNS server 200 (S22). In this case, the scanner 10 determines that the received IP address IP2 does not match the IP address IP1 included in the IP address list 40 (i.e., the received IP address IP2 is not included in the IP address list 40) (NO in S24), and in T106, generates a notification screen data representing the notification screen SC30, and stores the notification screen data in the memory 34 (S30).

Thereafter, in T110, the terminal 100 receives an access operation by the user. In this case, in T112, the terminal 100 transmits an access request to the scanner 10. The processing of T110 and T112 are the same as the processing of T10 and T12 in FIG. 2, respectively.

In response to receiving the access request from the terminal 100 in T112, in T114, the scanner 10 transmits the top screen data and the stored notification screen data to the terminal 100.

In response to receiving the top screen data and the notification screen data from the scanner 10 in T114, in T116, the terminal 100 displays the notification screen SC30 over the top screen SC1. By viewing the notification screen SC30, the user may know that the user should select the firewall setting icon included in the top screen SC1 and input the IP address IP2. The processing from T120 to T124 is the same as the processing from T20 to T24 in FIG. 2, respectively. Further, at this timing, since the IP address IP1 have been stored in the IP address list 40 (see T36 in FIG. 2), the IP address IP1 is described in one IP address input field in the setting screen SC10 of T130. Except for this point, the processing of T130 is the same as the processing of T30 in FIG. 2.

In T132, the terminal 100 receives the deletion of the IP address IP1 described in the IP address input field in the setting screen SC10, input of the IP address IP2 to the IP address input field, and selection of the OK button thereafter from the user. In this case, in T134, the terminal 100 transmits deletion information indicating that the IP address IP1 is to be deleted and the IP address IP2 to the scanner 10. In a modification, in T132, the terminal 100 may receive an input of the IP address IP2 in another IP address input field in the setting screen SC10 without receiving an operation of deleting the IP address IP1 from the user. In this modification, in T134, the terminal 100 transmits the IP address IP2 to the scanner 10 without transmitting the deletion information.

In response to receiving the deletion information and the IP address IP2 from the terminal 100 in T134, in T136, the scanner 10 updates the IP address list 40 in T136. To be specific, the scanner 10 deletes the IP address IP1 from the IP address list 40, and stores the IP address IP2 in the IP address list 40. Accordingly, the scanner 10 may store the IP address IP2 in the IP address list 40 in response to receiving the input of the IP address IP2 by the user.

Thereafter, in T140, the scanner 10 receives a scan execution instruction from the user via the operation unit 12 after a document is placed on the document placement table of the scanner 10 (YES in S12 of FIG. 3). The scan execution instruction includes designation of the folder name "TN1/SCAN_FOLDER" of the storage destination folder.

In response to receiving the scan execution instruction, the scanner 10 specifies the device name TN1 included in the designated folder name "TN1/SCAN_FOLDER". Then, in T142, the scanner 10 transmits the specified device name TN1 to the DNS server 200 (S20). The processing of T144 and T146 is similar to the processing of T102 and T104, respectively. As described above, since the scanner 10 executes the name resolution in response to receiving the scan execution instruction, the scanner may appropriately determine whether the scan data is capable of being transmitted.

In response to receiving the IP address IP2 (i.e., the target IP address) from the DNS server 200 in T146 (S22), the scanner 10 determines that the received IP address IP2 matches the IP address IP2 included in the IP address list 40 (YES in S24). Therefore, in T150, the scanner 10 scans the document placed on the document table and generates scan data. Then, in T152, the scanner 10 transmits the scan file to the folder having the folder name "TN1/SCAN FOLDER" designated in the scan execution instruction. That is, the scanner 10 transmits the scan data for which the folder name "TN1/SCAN_FOLDER" is designated as the storage destination to the IP address IP2 of the terminal 10.

In T152, the terminal 100 receives the scan data from the scanner 10. As a result, the scan data is stored in the folder having the folder name "TN1/SCAN_FOLDER". Thus, the user may obtain the scan data of the document.

Effect of First Embodiment

According to the above-described configuration, in a case where the scanner 10 determines that the IP address IP2 of the terminal 100 does not match the IP address IP1 included in the IP address list 40 (NO in S24 of FIG. 3), the scanner 10 generates the notification screen SC30 (S30). Thus, by viewing the notification screen SC30, the user may perform operation of storing the IP address IP2 in the IP address list 40 (see T120 to T136 in FIG. 4). Therefore, the scanner 10 may appropriately execute the communication with the terminal 100, specifically, the transmission of the scan data to the terminal 100. In another case where the IP address list 40 stores one or more IP addresses, if the scanner 10 determines that the IP address IP2 of the terminal 100 does not match any of the one or more IP addresses included in the IP address list 40, the scanner 10 may generate the notification screen SC30.

Correspondence

The scanner 10 is an example of a "communication device". The terminal 100 is an example of a "first external device". The firewall setting (that is, the IP address list 40) is an example of a "first setting". The scan folder setting (that is, the scan folder list 42) is an example of a "second setting". The IP address IP1 is an example of a "first IP address". The IP address IP2 is an example of a "second IP address". The device name TN1 is an example of a "first name". The folder name "TN1/SCAN_FOLDER" is an example of "first name information". The setting screen SC10 is an example of a "first screen". The setting screen SC20 is an example of a "second screen". The process of generating the notification screen data is an example of the "specific process" and the "notification process".

Second Embodiment

Next, a second embodiment will be described. The second embodiment is different in the processing of S30 in FIG. 3. To be specific, in S30 of FIG. 3, the CPU 32 automatically stores the target IP address received in S22 in the IP address list 40 without receiving the input of the IP address by the user. Therefore, the scanner 10 may appropriately execute communication with the terminal 100.

Third Embodiment

Next, a third embodiment will be described. The third embodiment is different from the first embodiment in the setting screen displayed in response to the firewall setting icon in the top screen SC1 being selected.

As shown in FIG. 1, the scanner 10 of the third embodiment stores a name list 44 in place of the IP address list 40. The name list 44 is a list for storing one or more device names of one or more external devices that are allowed to communicate with the scanner 10 and IP address of the external devices in association with each other.

Figure 5:
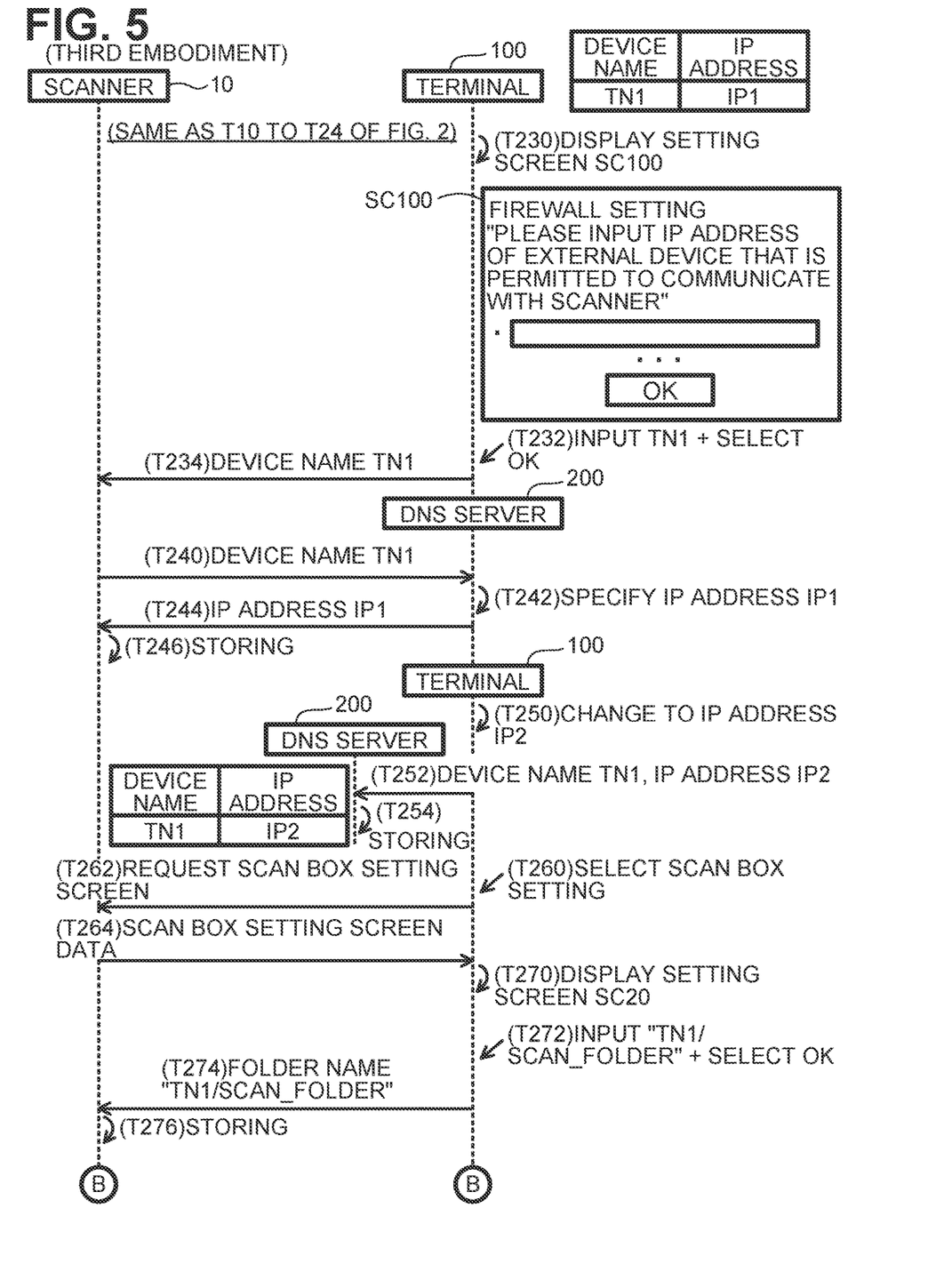
FIG. 5 is a sequence of the third embodiment.

Processing Executed by Each Device; FIG. 5

Next, a processing executed by each of the devices 10, 100, and the like will be described with reference to FIG. 5. The initial state of FIG. 5 is the same as the initial state of FIG. 2. In FIG. 5, first, processing that is the same as processing of T10 to T24 in FIG. 2 is executed.

Upon receiving the firewall setting screen from the scanner 10 in T24 of FIG. 2 referred to in FIG. 5, the terminal 100 displays the setting screen SC100 in T230. The setting screen SC100 includes a message for prompting the user to input the name of an external device permitted to communicate with the scanner 10, a plurality of input fields for inputting the names of devices, and an OK button.

In the T232, the apparatus 100 receives an input of the device name SC100 of the apparatus 100 by the user in one device name input field in the setting screen TN1, and then receives selection of the OK button. In this case, the terminals 100 transmit the input device name TN1 to the scanner 10 in T234.

In response to receiving the device name TN1 from the terminal 100 in T234, the scanner 10 executes name resolution using the received device name TN1 and obtains the IP address of the terminal 100. To be specific, in T240, the scanner 10 transmits the device name TN1 to the DNS server 200. In response to receiving the device name TN1 from the scanner 10 in T240, in T242, the DNS server 200 specifies the IP address IP1 associated with the device name TN1, and in T244, transmits the specified IP address IP1 to the scanner 10. In response to receiving the IP address IP1 from the DNS server 200 in T244, in T246, the scanner 10 stores the devices name TN1 and the IP address IP1 in association with each other in the name list 44. Thus, the scanner 10 may store the IP address IP1 in the name list 44 without receiving the input of the IP address IP1 by the user. After performing the processing in T246, the device name TN1 and the IP address IP1 may be stored in association with each other in the name list 44. The processing from T250 to T276 is the same as the processing from T40 to T66 in FIG. 2, respectively.

Figure 6:
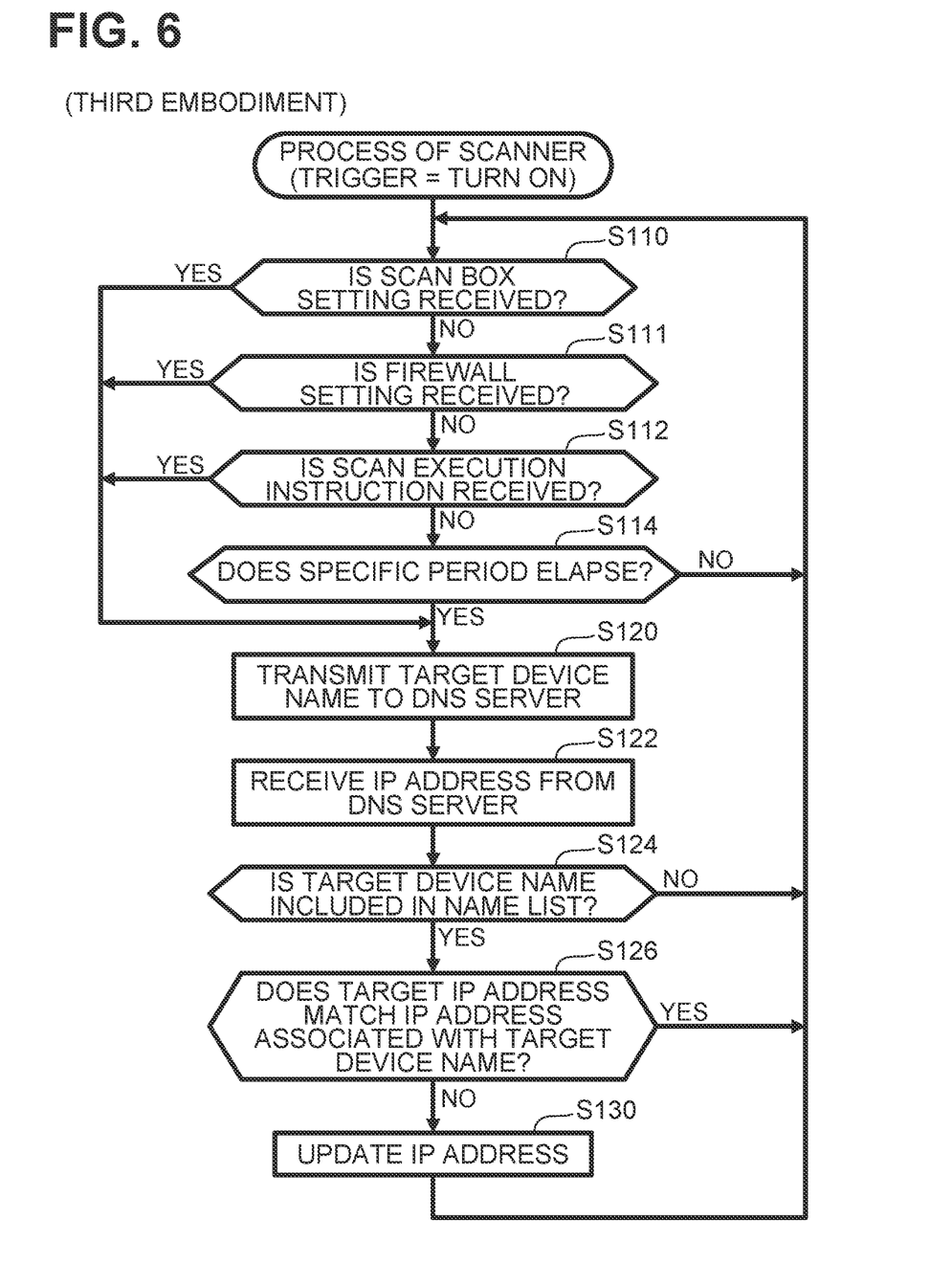
FIG. 6 is a flowchart of the processing executed by the scanner of the third embodiment.

Processing of Scanner; FIG. 6

Next, a process realized by the CPU32 of the scanner 10 of the third embodiment executing the program 36 will be described with reference to FIG. 6. The processing of FIG. 6 starts when the power of the scanner 10 is turned on.

The processing of S110 in FIG. 6 is the same as the processing of S10 in FIG. 3. In S111, the CPU 32 monitors, after the firewall setting icon (see the top screen SC1 in FIG. 2) is selected, input of the device name by the user. To be more specific, after the CPU 32 receives a request for a firewall setting screen (see T22 in FIG. 2 cited in FIG. 5) from an external device (for example, the terminal 100), the CPU 32 monitors reception of the device name (see T234 in FIG. 5). The CPU 32 proceeds the processing to S120 in response to receiving the device name from the external device (YES in S111). Hereinafter, the device name received here is also referred to as a "target device name".

The processing of S112 to S122 is the same as the processing of S12 to S22 in FIG. 3, respectively. In S124, the CPU 32 determines whether the target device name is stored in the name list 44. The CPU 32 proceeds the processing to S126 in a case where the target device name is stored in the name list 44 (YES in S124). The CPU 32 return the processing of monitoring in S110 in a case where the target device name is not stored in the name list 44 (NO in S124). Although not shown, in a case where the target device name received in S111 is not stored in the name list 44 (i.e., YES in S111 and NO in S124), the CPU 32 executes processing of storing the target device name and the target IP address received in S122 in association with each other in the name list 44.

In S126, the CPU 32 determines whether the target IP address matches the IP address associated with the target device name in the name list 44. The CPU 32 returns the processing to the monitoring of S110 in a case where the CPU 32 determines that the associated IP address match the target IP address (YES in S126). The CPU 32 proceeds the processing to S130 in a case where the CPU 32 determines that the associated IP address does not match the target IP address (NO in S126). Although not shown, in a case where the CPU 32 determines YES in S126 after the CPU 32 determines YES in S112, the CPU 32 executes scanning in accordance with the scan execution instruction, and transmits the scan data to the storage destination folder.

In S130, the CPU 32 updates the IP address associated with the target device name in the name list 44. Specifically, the CPU 32 stores the target IP address, instead of the stored IP address, in association with the target device name. In response to completion of processing of S130, the CPU return the processing to the monitoring of S110.

Figure 7:
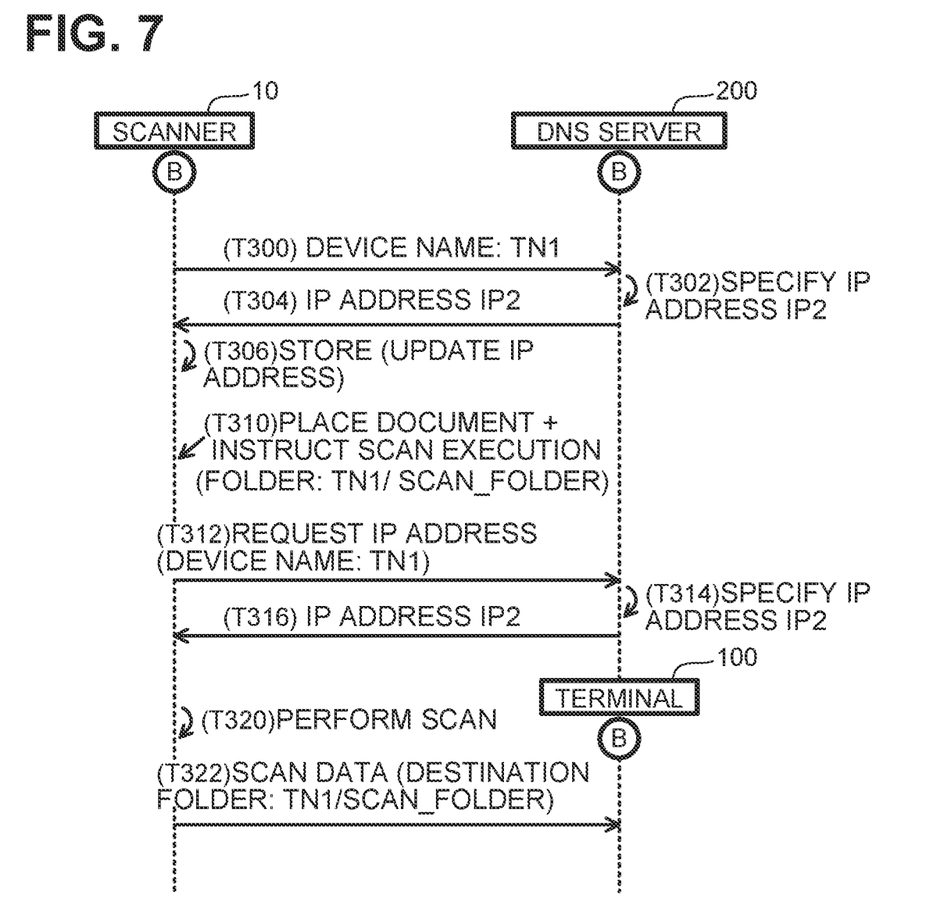
FIG. 7 is a sequence continued from FIG. 5.

Continuation of FIG. 5; FIG. 7

Next, the processing implemented by the flowchart of FIG. 6 will be described with reference to FIG. 7. FIG. 7 is a continuation of FIG. 5. As described above, the scanner 10 has already received the folder name "TN1/SCAN_FOLDER" from the terminal 100 in T274 of FIG. 5 (YES in S110 of FIG. 6). In this case, the scanner 10 specifies the device name TN1 included in the folder name. In T300, the scanner transmits the specified device name TN1 to the DNS server 200 (S120).

In response to receiving the device name TN1 from the scanner 10 in T300, in T302, the DNS server 200 specifies the IP address IP2 associated with the device name TN1 (see T254 in FIG. 5). Then, in T304, the DNS server 200 transmits the specified IP address IP2 to the scanner 10.

In T304, the scanner 10 receives IP address IP2 (i.e., target IP address) from the DNS server 200 (S22). In this case, the scanner 10 determines that the device name TN1 included in the received folder name "TN1/SCAN_FOLDER" is stored in the name list 44 (YES in S124). In addition, the scanner 10 determines that the target IP address IP2 does not match the IP address IP1 associated with the device name TN1 (NO in S126). Therefore, in T306, the scanner 10 stores the IP address IP2, instead of the IP address IP1, in association with the devices name TN1 in the name list 44 (S130). That is, the scanner 10 updates the IP address IP1 associated with the device name in the name list 44 to the second IP address IP2. The processing from T310 to T322 is similar to the processing from T140 to T152 in FIG. 4, respectively.

Effect of Third Embodiment

According to the above-described configuration, in response to determining that the IP address IP2 received from the DNS server 200 does not match the IP address IP1 associated with the devices name TN1 in the name list 44 (NO in S126), the scanner 10 updates the IP address IP1 associated with the devices name TN1 in the name list 44 to the IP address IP2. Therefore, the scanner 10 may appropriately perform communication with the terminal 100.

Correspondence

The firewall setting (i.e., the name list 44) is an example of a "first setting". The setting screen SC100 is an example of a "first screen".

Although specific examples of the technology disclosed herein have been described in detail above, these are merely examples, and do not limit the scope of the claims. The technology described in the appended claims includes various modifications and changes of the specific examples described above. Modifications of the above-described embodiment are listed below.

Modification 1

In each of the embodiments described above, the scanner 10 receives an input of information such as an IP address or a folder name from the terminal 100 by using the web server function of the scanner 10. Alternatively, the scanner 10 may display a screen such as the setting screen SC10 on the display unit 14 of the scanner 10. The scanner 10 may receive an input of information such as the IP address or the folder name from the user via the operation unit 12.

Modification 2

In the above-described first embodiment, the setting screen SC10 for receiving input of IP address and the setting screen SC20 for receiving input of folder names are configured as separate screens. Alternatively, the scanner 10 may be configured to receive the input of the IP address and the input of the folder name on a single setting screen. In the third embodiment, the setting screen SC100 for receiving the input of the device name and the setting screen SC20 for receiving the input of the folder name are configured as separate screens. Alternatively, the scanner 10 may be configured to receive an input of a device and an input of a folder name on a single setting screen.

Modification 3

The CPU 32 may display the notification screen SC30 on the display unit 14 in S30 of FIG. 3. In the present modification, the process of displaying the notification screen SC30 on the display unit 14 is an example of the "specific process" and the "notifying process". In another modification, in S30 of FIG. 3, the CPU 32 may transmit a notification including each message in the notification screen SC30 to the external device without generating the notification screen SC30 itself. For example, the CPU 32 may transmit the notification to the external device in accordance with a protocol such as HTTP, or may transmit an electronic mail including the notification to the external device. In this modification, the transmission of the notification to the external device is an example of "specific process" and "notifying process".

Modification 4

The processing of S12 in FIG. 3 may be omitted. That is, in response to receiving the scan execution instruction, the processing after the S20 may not be executed. Generally speaking, the CPU 32 may not obtain the second IP address in response to receiving the instruction of the execution of the communication using the specific name information included in the second setting.

Modification 5

The communication system 2 may not include the DNS server 200. For example, in S20 of FIG. 3, the CPU 32 may transmit the device name to the LAN 4, and receive, from the device to which the device name is assigned among the devices in the LAN 4, the IP address of the device. In another modification, the scanner 10 itself may have a DNS server function. In this modification, instead of executing the processing of S20 and S22 in FIG. 3, the CPU 32 may specify the IP address associated with the target device name from the memory 34. Generally speaking, the name resolution method is not particularly limited.

Modification 6

In each of the above-described embodiments, the setting screen SC20 is a screen for registering a folder of a storage destination of scan data. Alternatively, in a modification, the setting screen SC20 may be a screen for registering a storage destination such as an event log, facsimile data, or a telephone directory transmitted from the scanner 10. Generally speaking, the "second setting" may be a setting for registering a storage destination of data transmitted from the communication device.

Modification 7

In the above-described embodiment, the processing of the respective steps of FIGS. 2 to 7 is realized by software (for example, the program 36), but at least one of these processes may be realized by hardware such as a logic circuit.

The technical elements described in the present specification or the drawings exhibit technical utility alone or in various combinations, and are not limited to the combinations described in the claims at the time of filing. In addition, the technique illustrated in the present specification or the drawings can achieve a plurality of objects at the same time, and has technical utility by achieving one of the objects.

What is claimed is:

1. A communication device comprising:
a memory; and
a controller configured to:
receive a first IP address of a first external device as an input by a user;
store the first IP address received as a first setting in the memory;
receive first name information including a first name of the first external device as an input by the user;
store the first name information received as a second setting different from the first setting in the memory;
after the first IP address has been stored as the first setting in the memory and the first name information has been stored as the second setting in the memory, obtain a second IP address of the first external device by performing a name resolution with the first name included in the first name information;
determine whether the second IP address matches with the first IP address included in the first setting in the memory; and
in a case where the controller determines that the second IP address does not match with the first IP address included in the first setting in the memory, perform a specific process that is relevant to storing the second IP address in the memory as the first setting.

2. The communication device according to claim 1, wherein the controller is configured to determine the second IP address matches with the first IP address included in the first setting in the memory in a case where at least a portion of digits of the second IP address is identical to at least a portion of digits of the first IP address.

3. The communication device according to claim 1, wherein the communication device is communicable with one or more external devices including the first external device,
wherein the memory is configured to store:
one or more IP addresses of the one or more external devices including the first IP address as the first setting; and
one or more pieces of name information of the one or more external devices including the first name information as the second setting.

4. The communication device according to claim 3, wherein the controller is configured to determine whether the second IP address matches with any of the one or more IP addresses in the first setting in the memory.

5. The communication device according to claim 1, wherein the controller is configured to receive the first IP address as an input into a first screen by the user, and
wherein the controller is configured to receive the first name information as an input into a second screen different from the first screen by the user.

6. The communication device according to claim 1, wherein the specific process includes a notifying process of notifying the user that the second IP address is to be stored as the first setting in the memory.

7. The communication device according to claim 6, wherein the controller is configured to store the second IP address as the first setting in the memory in response to receiving the second IP address as an input by the user after the notifying process is performed.

8. The communication device according to claim 1, wherein the specific process includes a storing process of storing the second IP address in the memory as the first setting without receiving the second IP address as an input by the user.

9. The communication device according to claim 1, wherein the controller is configured to obtain the second IP address in response to receiving an instruction from the user for performing a communication using the first name information included in the second setting.

10. The communication device according to claim 1, wherein the controller is configured to transmit the first name included in the first name information to a DNS server and receive the second IP address associated with the first name from the DNS server.

11. The communication device according to claim 1, wherein the second setting is a setting for registering a destination of data transmitted from the communication device.

12. The communication device according to claim 11, wherein the data includes scan data generated by the communication device.

13. A communication device comprising:
a memory; and
a controller configured to:
receive a first name of a first external device as an input by a user;
obtain a first IP address of the first external device by performing a name resolution with the first name received;
store the first name and the first IP address in association with each other as a first setting in the memory;
receive first name information including the first name of the first external device as an input by a user;
store the first name information received as a second setting different from the first setting in the memory;
after the first name and the first IP address have been stored as the first setting in the memory and the first name information has been stored as the second setting in the memory, obtain a second IP address of the first external device by performing a name resolution with the first name included in the first name information;
determine whether the second IP address matches with the first IP address associated with the first name as the first setting in the memory; and
in a case where the controller determines that the second IP address does not match with the first IP address, update the first IP address associated with the first name as the first setting to the second IP address.

14. The communication device according to claim 13, wherein the controller is configured to determine the second IP address matches with the first IP address associated with the first name as the first setting in the memory in a case where at least a portion of digits of first IP address is identical to a portion of digits of the second IP address.

15. The communication device according to claim 13, wherein the communication device is communicable with one or more external devices including the first external device,
wherein the memory is configured to store:
one or more names including the first name and one or more IP addresses including the first IP address of the one or more external devices, a name and an IP address of each of the one or more external devices being in association with each other, as the first setting; and
one or more pieces of name information including the first name information of the one or more external devices as the second setting.

16. The communication device according to claim 13, wherein the controller is configured to receive the first name as an input into a first screen by the user, and
wherein the controller is configured to receive the first name information as an input into a second screen different from the first screen by the user.

17. The communication device according to claim 13, wherein the controller is configured to store the first name and the first IP address in association with each other in the memory as the first setting without receiving the first IP address as an input by the user.

18. The communication device according to claim 13, wherein the controller is configured to obtain the second IP address in response to receiving an instruction from the user for performing a communication using the first name information stored in the second setting.

19. The communication device according to claim 13, wherein the controller is configured to transmit the first name included in the name information to a DNS server and receive the second IP address associated with the first name from the DNS server.

20. The communication device according to claim 13, wherein the second setting is a setting for registering a destination of data transmitted from the communication device.

21. The communication device according to claim 20, wherein the data includes scan data generated by the communication device.

22. A non-transitory computer-readable recording medium storing computer-readable instructions for a communication device,
the communication device comprising:
a memory; and
a processor,
wherein the computer-readable instructions, when executed by the processor, cause the communication device to:
receive a first IP address of a first external device as an input by a user;
store the first IP address received as a first setting in the memory;
receive first name information including a first name of the first external device as an input by the user;
store the first name information received as a second setting different from the first setting in the memory;
after the first IP address has been stored as the first setting in the memory and the first name information has been stored as the second setting in the memory, obtain a second IP address of the first external device by performing a name resolution with the first name included in the first name information;
determine whether the second IP address matches with the first IP address included in the first setting in the memory; and
in a case where the controller determines that the second IP address does not match with the first IP address included in the first setting in the memory, perform a specific process that is relevant to storing the second IP address in the memory as the first setting.

23. A non-transitory computer-readable recording medium storing computer-readable instructions for a communication device,
the communication device comprising:
a memory; and
a processor,
wherein the computer-readable instructions, when executed by the processor, cause the communication device to:
receive a first name of a first external device as an input by a user;
obtain a first IP address of the first external device by performing a name resolution with the first name received;
store the first name and the first IP address in association with each other as a first setting in the memory;
receive first name information including the first name of the first external device as an input by the user;
store the first name information received as a second setting different from the first setting in the memory;
after the first name and the first IP address have been stored as the first setting in the memory and the first name information has been stored as the second setting in the memory, obtain a second IP address of the first external device by performing a name resolution with the first name included in the first name information;
determine whether the second IP address matches with the first IP address associated with the first name as the first setting; and
in a case where the controller determines that the second IP address does not match with the first IP address, update the first IP address associated with the first name as the first setting to the second IP address.

* * * * *